(12) United States Patent
Wang

(10) Patent No.: US 11,454,870 B2
(45) Date of Patent: Sep. 27, 2022

(54) PROJECTION DEVICE

(71) Applicant: Coretronic Corporation, Hsin-Chu (TW)

(72) Inventor: Yi-Fa Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/213,205

(22) Filed: Mar. 25, 2021

(65) Prior Publication Data
US 2021/0302812 A1 Sep. 30, 2021

(30) Foreign Application Priority Data
Mar. 27, 2020 (CN) .......................... 202020413548.X

(51) Int. Cl.
*G03B 21/14* (2006.01)
*G03B 21/28* (2006.01)

(52) U.S. Cl.
CPC .......... *G03B 21/142* (2013.01); *G03B 21/145* (2013.01); *G03B 21/28* (2013.01)

(58) Field of Classification Search
CPC ...... G03B 21/00; G03B 21/14; G03B 21/142; G03B 21/145; G03B 21/28
USPC .......................... 353/30, 69, 70, 79, 101, 119
See application file for complete search history.

(56) References Cited

U.S. PATENT DOCUMENTS

| | | | | |
|---|---|---|---|---|
| 7,556,385 B2 * | 7/2009 | Kitahara | ............... | G03B 21/145 353/122 |
| 9,060,421 B2 * | 6/2015 | Yang | ..................... | G03B 21/145 |
| 2011/0260015 A1 * | 10/2011 | Yamakose | .............. | G03B 21/30 248/157 |
| 2014/0118704 A1 * | 5/2014 | Duelli | ..................... | G06F 3/042 353/70 |

FOREIGN PATENT DOCUMENTS

| | | |
|---|---|---|
| CN | 103353704 | 10/2013 |
| TW | M347014 | 12/2008 |

* cited by examiner

*Primary Examiner* — William C. Dowling
(74) *Attorney, Agent, or Firm* — JCIPRNET

(57) ABSTRACT

A projection device is adapted to be placed on a surface and includes a projection lens and a projection device housing. The projection lens is connected to the projection device housing, and the projection device housing includes a main casing and a supporting assembly disposed on the main casing in a flipping manner. When the projection device housing is located in a folded position, the supporting assembly leans against the main casing and the projection lens faces a first direction. When the projection device housing is located in an unfolded position, the supporting assembly is flipped with respect to the main casing and is adapted to stand on the surface, and the projection lens faces a second direction and is adapted to project onto the surface. The projection device may project onto the standing surface without a tall casing or a bracket to be included or additionally assembled.

5 Claims, 10 Drawing Sheets

PROJECTION DEVICE

CROSS-REFERENCE TO RELATED APPLICATION

This application claims the priority benefit of China application serial no. 202020413548.X, filed on Mar. 27, 2020. The entirety of the above-mentioned patent application is hereby incorporated by reference herein and made a part of this specification.

BACKGROUND

Technical Field

The invention relates to a projection device, and more particularly, to a projection device capable of performing projection onto different surfaces.

Description of Related Art

Regarding an existing projector, if the projector is configured to perform projection onto a desktop, the lens of the projector may be too close to the projection surface, and such technical problem may prevent the projector from performing projection of a large image. To solve this problem, the lens is generally designed to be disposed at a high position on the casing, or a bracket is additionally added to elevate the projector, so as to achieve the effect of large image projection. Nevertheless, the size of the casing in the height direction is required to be large enough to set the lens on a high position of the casing. Moreover, the added bracket requires extra costs, and when the bracket is required to be used, it is laborious since the bracket has to be installed every time.

The information disclosed in this BACKGROUND section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection device capable of performing projection onto a standing surface without a tall casing or a bracket to be included or additionally assembled.

Other features and advantages of the invention are disclosed by the technical features broadly embodied and described as follows.

In order to achieve one or part of or all of the objects or other objects, an embodiment of the invention provides a projection device adapted to be placed on a surface and including a projection lens and a projection device housing. The projection lens is connected to the projection device housing, and the projection device housing includes a main casing and a supporting assembly disposed on the main casing in a flipping manner. When the projection device housing is located in a folded position, the supporting assembly leans against the main casing and the projection lens faces a first direction. When the projection device housing is located in an unfolded position, the supporting assembly is flipped with respect to the main casing and is adapted to stand on the surface, and the projection lens faces a second direction and is adapted to project onto the surface.

To sum up, the projection device housing of the projection device provided by the invention includes the main casing and the supporting assembly disposed on the main casing in a flipping manner. When the projection device housing is located in the folded position, the supporting assembly leans against the main casing and the projection lens faces the first direction. When the projection device housing is located in the unfolded position, the supporting assembly is flipped with respect to the main casing and is adapted to stand on the surface. At this moment, the projection lens faces the second direction and is adapted to project onto the standing surface (e.g., a desktop). Accordingly, the projection device provided by the invention may not only project in the first direction but also project onto the standing surface without a tall casing or a bracket to be included or additionally assembled.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
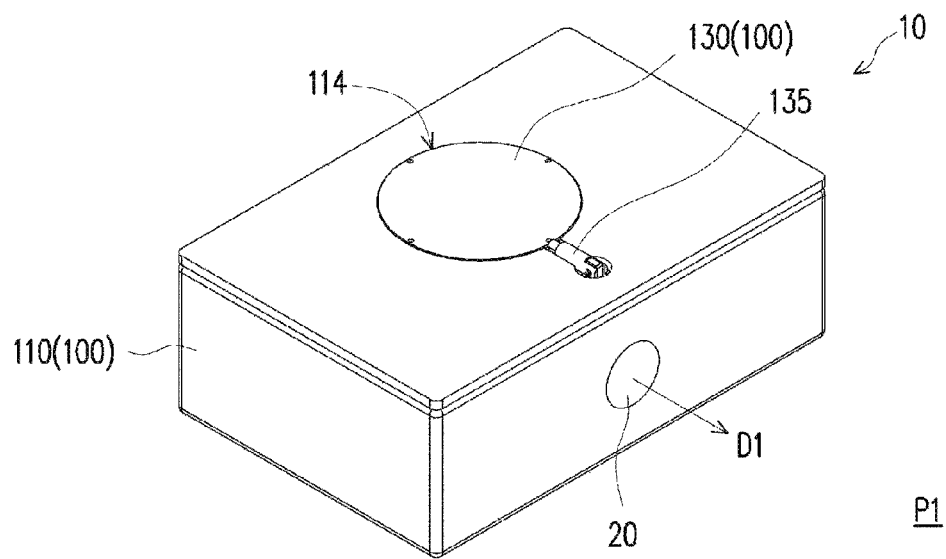
FIG. 1 is a schematic view of a projection device in a folded position according to an embodiment of the invention.
Figure 2:
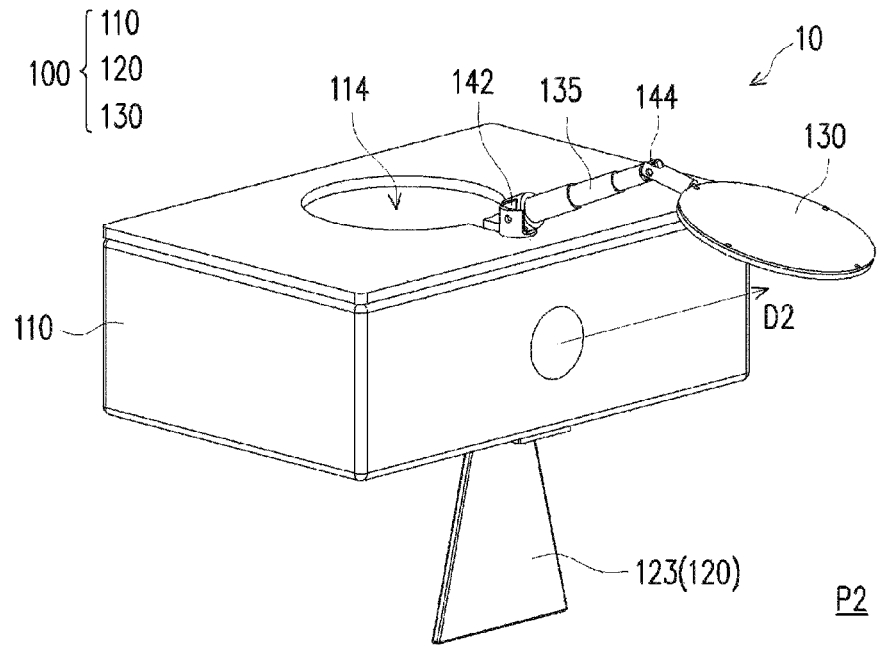
FIG. 2 is a schematic view of the projection device of FIG. 1 in an unfolded position.
Figure 3:
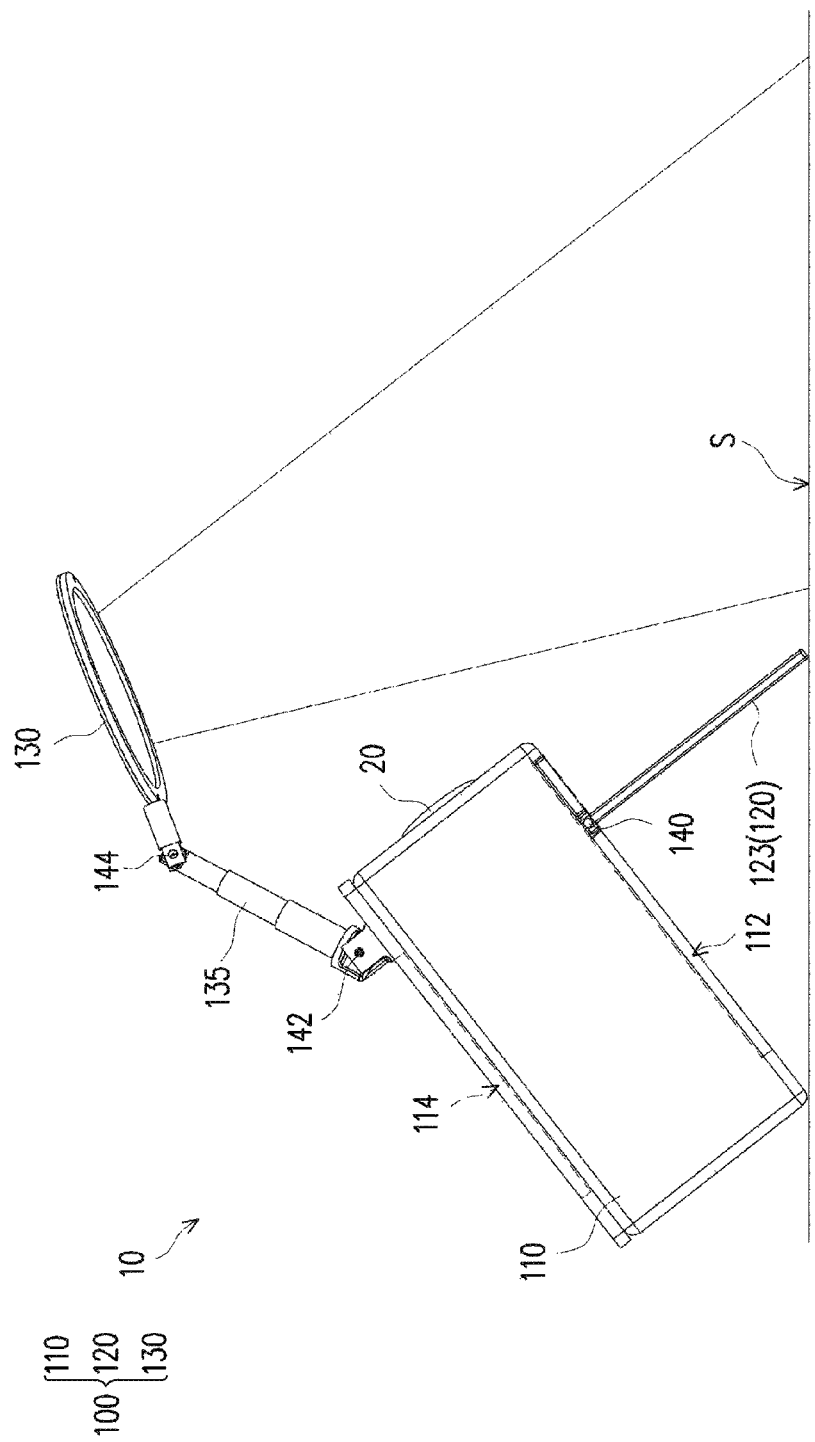
FIG. 3 is a schematic view of the projection device of FIG. 1 projecting onto a standing surface.

FIG. 1 is a schematic view of a projection device in a folded position according to an embodiment of the invention. FIG. 2 is a schematic view of the projection device of FIG. 1 in an unfolded position. FIG. 3 is a schematic view of the projection device of FIG. 1 projecting onto a standing surface. With reference to FIG. 1 to FIG. 3, a projection device 10 of this embodiment includes a projection lens 20 and a projection device housing 100. The projection device housing 100 includes a main casing 110 and a supporting assembly 120 disposed on the main casing 110 in a flipping manner. The projection lens 20 is connected to the main casing 110 of the projection device housing 100 and may project an image towards a first direction D1. In other embodiments, the projection lens 20 may protrude from the main casing 110 of the projection device housing 100. The supporting assembly 120 includes a supporting member 123, and the supporting member 123 is pivotally connected to a bottom portion of the main casing 110 through a pivotal connecting portion 140 (FIG. 3).

With reference to FIG. 1 to FIG. 3 together, it can be seen that when the projection device housing 100 is located in a folded position P1 (FIG. 1), the supporting assembly 120 (FIG. 2) leans against the main casing 110. At this moment, the projection lens 20 faces the first direction D1. In FIG. 3, it can be seen that the main casing 110 includes a first groove 112. In the present embodiment, when the projection device housing 100 is located in the folded position P1, the supporting assembly 120 is located in the first groove 112.

An area of the first groove 112 is less than a bottom area of the main casing 11 but is greater than or equal to an area of the supporting assembly 120, so that the supporting assembly 120 may be accommodated in the first groove 112 when being stored. A depth of the first groove 112 is greater than or equal to a depth of the supporting assembly when the supporting assembly 120 is stored, so that when the projection device housing 100 is located in the folded position P1, the bottom portion of the main casing 110 may at least be partially attached to the a surface S (shown in FIG. 3, e.g., a desktop) horizontally without tilting.

In addition, as shown in FIG. 2 to FIG. 3, when the projection device housing 100 is located in an unfolded position P2, the supporting assembly 120 is flipped with respect to the main casing 110 and is adapted to stand on the surface S, and the projection lens 20 faces a second direction D2, projects a projection image to a reflection mirror 130, and is adapted to project onto the surface S (e.g., a desktop) through reflection performed by the reflection mirror 130.

In detail, in this embodiment, the projection device housing 100 may selectively include the reflection mirror 130 disposed on the main casing 110 in a flipping manner. The reflection mirror 130 is connected to the main casing 110 through a retractable rod 135, so that a length of the reflection mirror 130 protruding from the main casing 110 may be adjusted. Specifically, the retractable rod 135 is pivotally connected to the main casing 110 through the pivotal connecting portion 142, and the reflection mirror 130 is pivotally connected to the retractable rod 135 through the pivotal connecting portion 142.

When the projection device housing 100 is located in the unfolded position P2, the reflection mirror 130 is located in the second direction D2 that the projection lens 20 faces, so as to reflect the projection image projected by the projection lens 20 onto the surface S. In the projection device 10, a projection path (a path through which the projection image is transmitted) may be increased through the use of the reflection mirror 130, so that an image projected onto the surface S exhibits a sufficiently large size. Certainly, in another embodiment, the second direction D2 may also be a direction that faces the desktop, and reflection is not required to be performed through the reflection mirror 130.

In addition, in this embodiment, the main casing 110 includes a second groove 114 (FIG. 3). When the projection device housing 100 is located in the folded position P1, the reflection mirror 130 is located in the second groove 114, and in this way, the projection device housing 100 may exhibit a complete appearance when located in the folded position P1.

In the projection device 10 of this embodiment, through the use of the supporting assembly 120 disposed on the main casing 110, the main casing 110 of the projection device 10 may be elevated when being in the unfolded position and turns to a portion of the projection device housing 100 when being stored. In this way, a size of the projection device housing 100 in a height direction is not limited, and since a bracket is not required to be additionally added, the projection device may be conveniently used.

Figure 4:
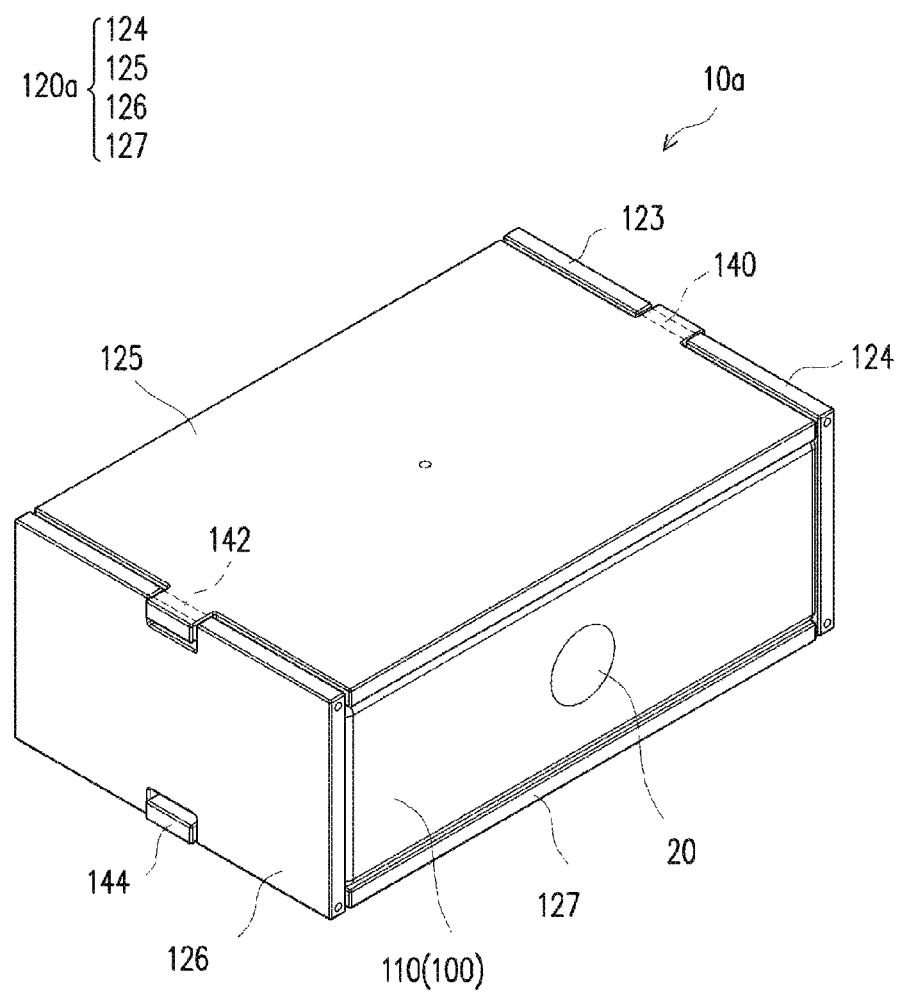
FIG. 4 is a schematic view of a projection device in the folded position according to another embodiment of the invention.
Figure 5:
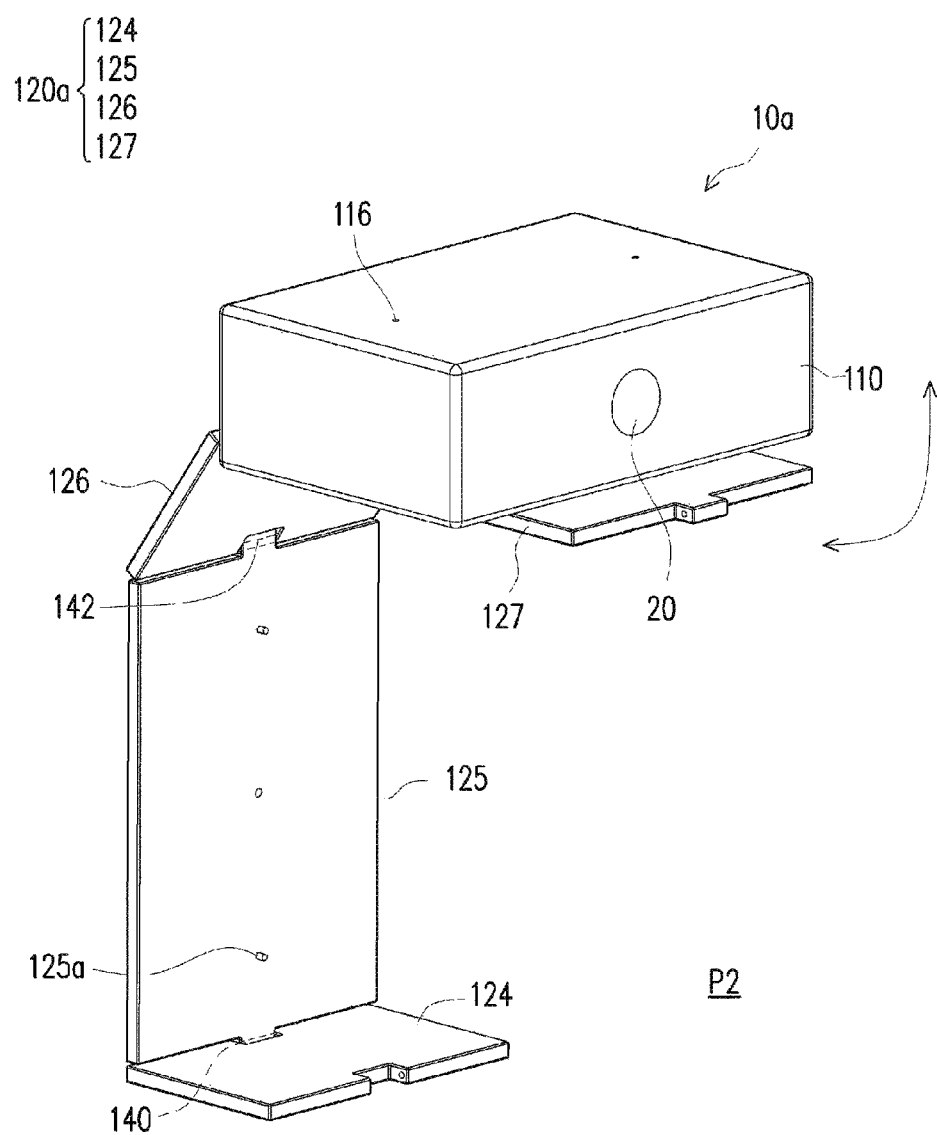
FIG. 5 is a schematic view of the projection device of FIG. 4 in the unfolded position.

FIG. 4 is a schematic view of a projection device in the folded position according to another embodiment of the invention. FIG. 5 is a schematic view of the projection device of FIG. 4 in the unfolded position. With reference to FIG. 4 and FIG. 5, in the present embodiment, a supporting assembly 120a of a projection device 10a includes a plurality of supporting members 124, 125, 126, and 127, and the supporting members 124, 125, 126, and 127 are sequentially arranged and are pivotally connected to one another end to end. In the present embodiment, a plurality of pivotal connecting portions 140, 142, and 144 are disposed between any two of the supporting members 124, 125, 126, and 127, so that an angle between the two connected supporting members among the supporting members 124, 125, 126, and 127 may be adjusted.

The supporting member 127 is horizontally attached to the bottom surface of the main casing 110 and is pivotally disposed on the main casing 110. As shown in FIG. 5, the supporting member 127 may rotate with respect to the main casing 110 when being horizontally attached to the bottom surface of the main casing 110. Certainly, the relationship between the supporting member 127 located on the bottom surface of the main casing 110 and the main casing 110 is not limited herein. In other embodiments, the supporting member 127 may be fixed to the bottom surface of the main casing 110.

As shown in FIG. 4, when being in the folded position P1, the supporting members 124, 125, 126, and 127 surround at least part of the main casing 110, and the supporting member 127 is adapted to contact the surface S. As shown in FIG. 5, when being in the unfolded position P2, the supporting members 124, 125, 126, and 127 are flipped with respect to one another. The supporting member 124 is adapted to be placed on the surface to contact the surface. The direction that the projection lens 20 faces may be changed when the supporting member 127 rotates with respect to the supporting member 126, so that the projection lens 20 may face the surface.

In addition, as shown in FIG. 5, the supporting member 125 has an alignment column 125a, and the main casing 110 has an alignment hole 116. In the folded position P1, the alignment column 125a of the supporting member 125 extends into the alignment hole 116 on the main casing 110, so that the supporting members 124, 125, 126, and 127 are well received.

Figure 6:
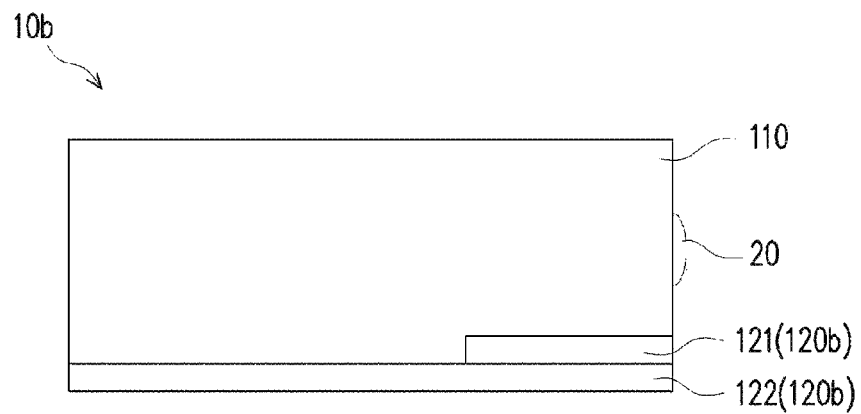
FIG. 6 is a schematic view of a projection device in the folded position according to another embodiment of the invention.
Figure 7:
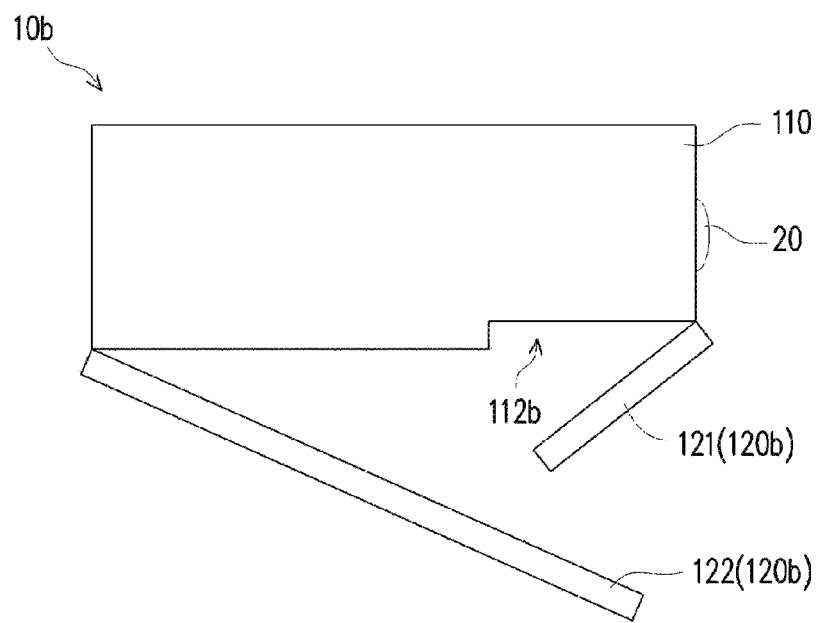
FIG. 7 is a schematic view of the projection device of FIG. 6 in the unfolded position.
Figure 8:
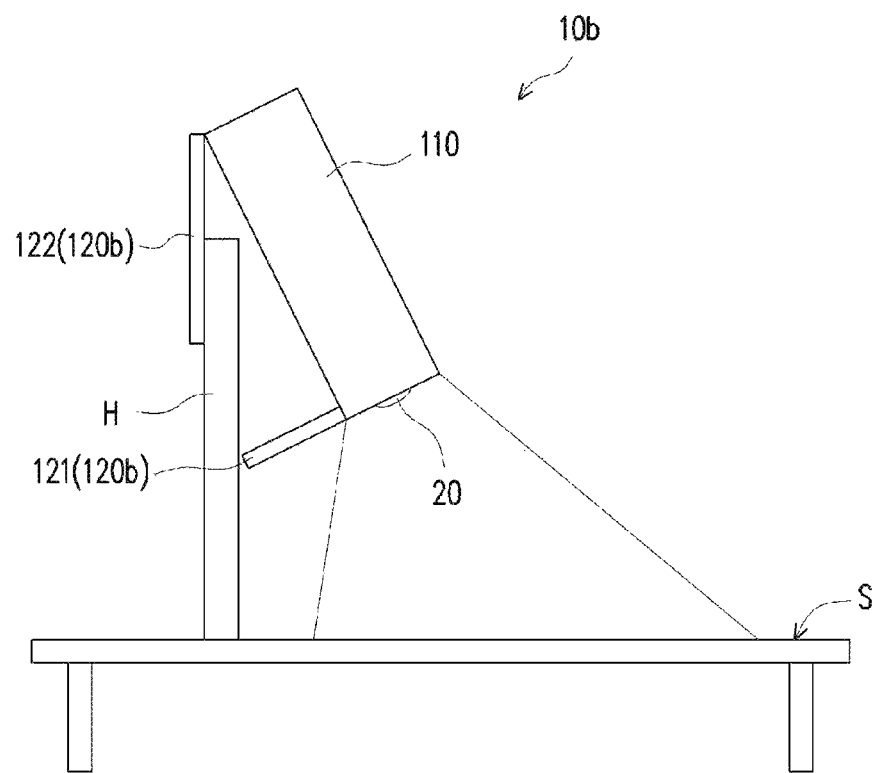
FIG. 8 is a schematic view of the projection device of FIG. 6 projecting onto a standing surface.

FIG. 6 is a schematic view of a projection device in the folded position according to another embodiment of the invention. FIG. 7 is a schematic view of the projection device of FIG. 6 in the unfolded position. FIG. 8 is a schematic view of the projection device of FIG. 6 projecting onto a standing surface. With reference to FIG. 6 to FIG. 8, in the present embodiment, a supporting assembly 120b of a projection device 10b includes a first supporting member 121 and a second supporting member 122 pivotally connected to two opposite ends on the bottom surface of the main casing 110. As shown in FIG. 8, in the unfolded position P2, the first supporting member 121 and the second supporting member 122 are configured to clamp an object (e.g., a rod member H) which is not parallel to the surface S together, so that projection on the surface S may be performed.

In addition, as shown in FIG. 7, the bottom surface of the main casing 110 includes the first groove 112. When the first supporting member 121 and the second supporting member 122 are received, the first supporting member 121 is located in the first groove 112, and the second supporting member 122 is stacked below the first supporting member 121. That is, the first supporting member 121 and the second supporting member 122 partially overlap.

Figure 9:
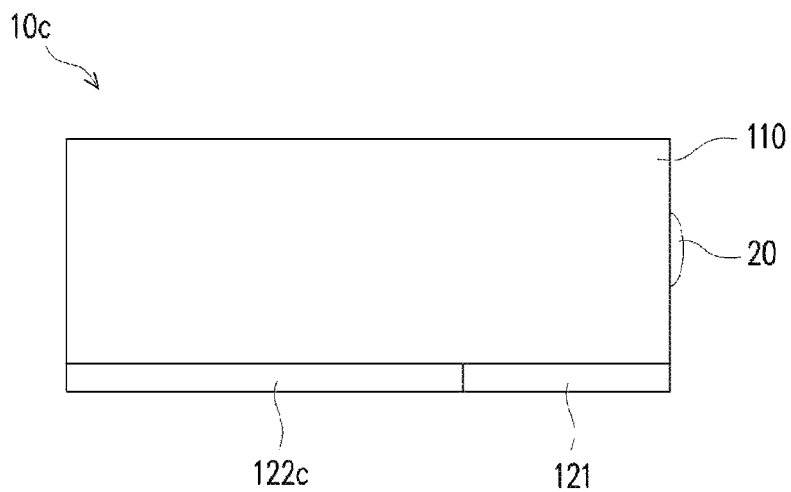
FIG. 9 is a schematic view of a projection device in the folded position according to another embodiment of the invention.
Figure 10:
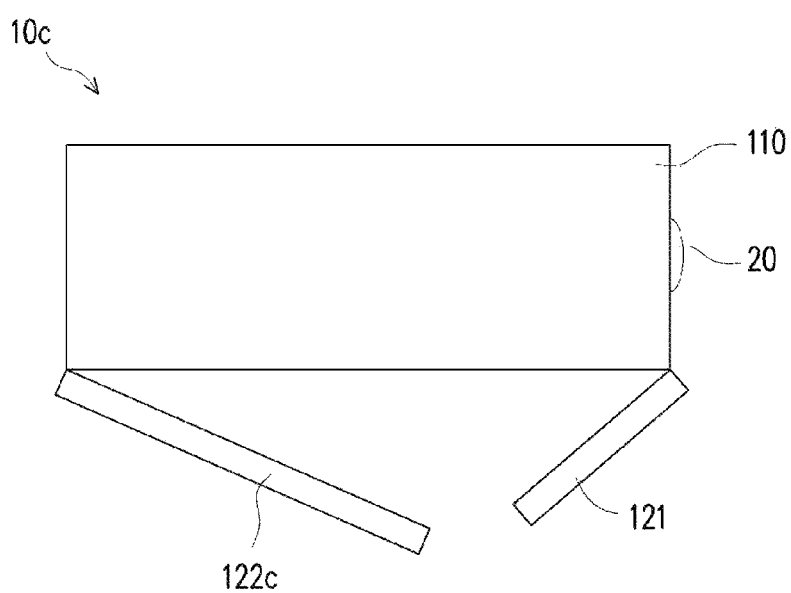
FIG. 10 is a schematic view of the projection device of FIG. 9 in the unfolded position.

FIG. 9 is a schematic view of a projection device in the folded position according to another embodiment of the invention. FIG. 10 is a schematic view of the projection device of FIG. 9 in the unfolded position. With reference to FIG. 9 and FIG. 10, the difference between a projection device 10c of this embodiment and the projection device 10b of the preceding embodiment is the difference in lengths of second supporting members 122 and 122c. In this embodiment, when the first supporting member 121 and the second supporting member 122c are received, the first supporting member 121 and the second supporting member 122c lean against the main casing 110 and are located on a same plane.

In this embodiment, the length of the second supporting member 122c is short and thus the second supporting member 122c and the first supporting member 121 are located on the same plane when being received. Nevertheless, the first supporting member 121 and the second supporting member 122c may still be configured to clamp an object which is not parallel to the surface S (shown in FIG. 8), so that projection on the surface S may be performed.

Figure 11:
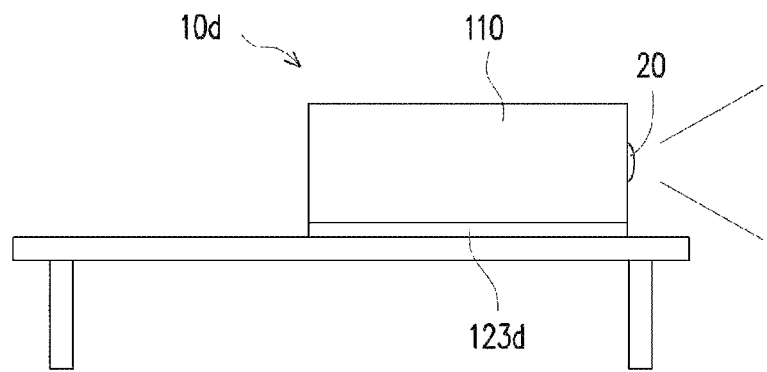
FIG. 11 is a schematic view of a projection device in the folded position according to another embodiment of the invention.
Figure 12:
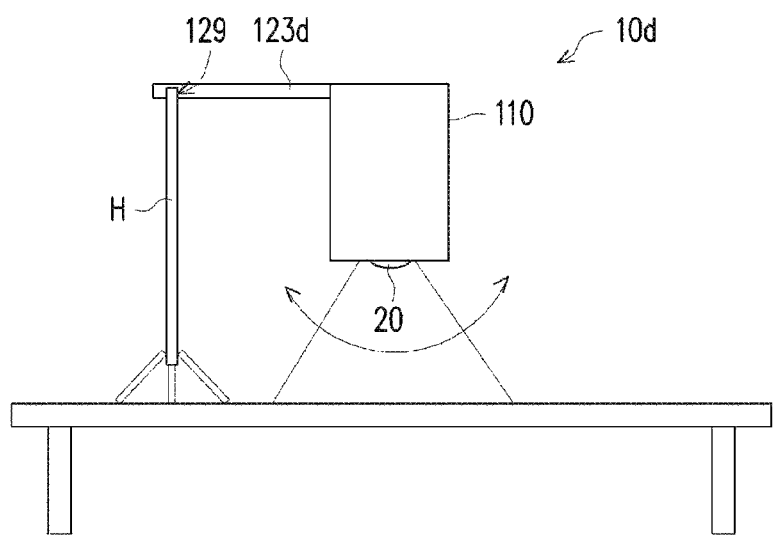
FIG. 12 is a schematic view of the projection device of FIG. 11 in the unfolded position.

FIG. 11 is a schematic view of a projection device in the folded position according to another embodiment of the invention. FIG. 12 is a schematic view of the projection device of FIG. 11 in the unfolded position. With reference to FIG. 11 and FIG. 12, in the present embodiment, one end of a supporting member 123d of a projection device 10d is pivotally disposed on the main casing 110, so that the main casing 110 may rotate with respect to the supporting member 123d, so that an angle therebetween may be adjusted. The supporting member 123d has a fixing portion 129 (FIG. 12) near the other end. The fixing portion 129 is adapted to be fixed to the rod member H, so as to be indirectly fixed onto the surface and stand on the surface. The fixing portion 129 includes an engagement hole in this embodiment, but the fixing portion 129 may include a locking hole in other embodiments, and types of the fixing portion 129 is not limited herein.

Figure 13:
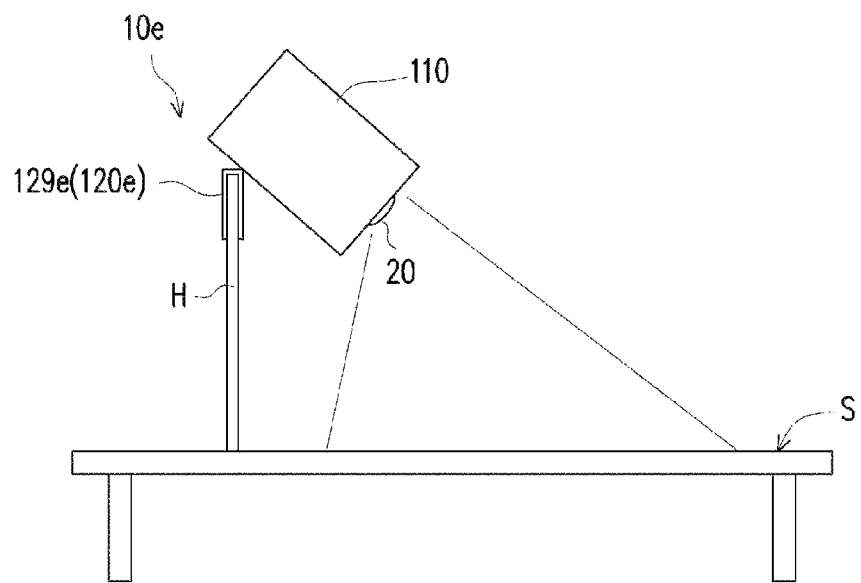
FIG. 13 is a schematic view of a projection device in the unfolded position according to another embodiment of the invention.

FIG. 13 is a schematic view of a projection device in the unfolded position according to another embodiment of the invention. With reference to FIG. 13, in this embodiment, a fixing portion 129e of a supporting assembly 120e of a projection device 10e includes a plurality of flexible claws, which may be expanded and contracted with respect to each other, and a user may adjust a shape of the flexible claws so that the flexible claws may be used for clamping at an appropriate position. The flexible claws may be soft wires, for example, but the types of the flexible claws are not limited herein.

Figure 14:
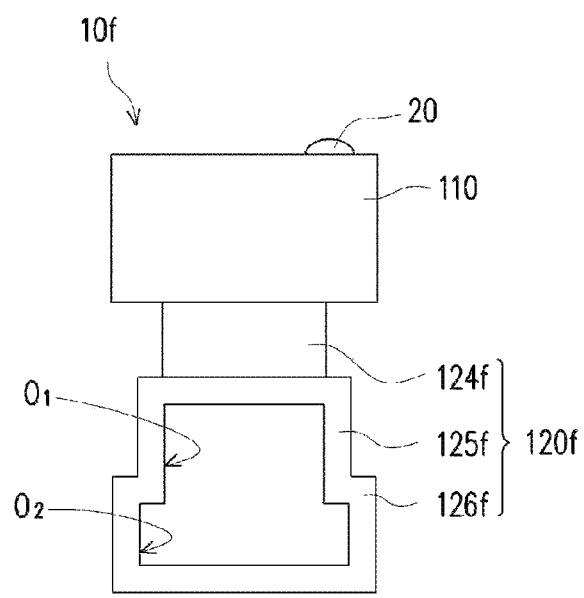
FIG. 14 is a schematic view of a supporting assembly of a projection device lain flat according to another embodiment of the invention.
Figure 15:
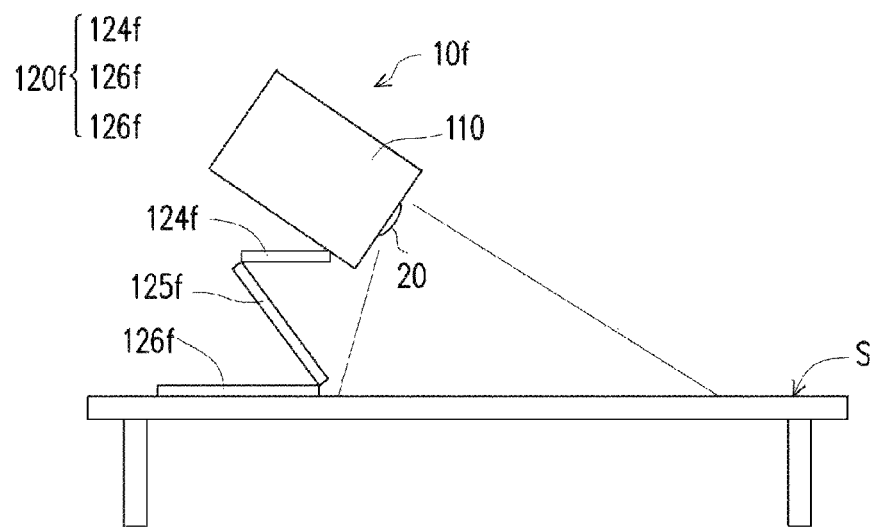
FIG. 15 is a schematic view of the projection device of FIG. 14 in the unfolded position.

FIG. 14 is a schematic view of a supporting assembly of a projection device lain flat according to another embodiment of the invention. FIG. 15 is a schematic view of the projection device of FIG. 14 in the unfolded position. With reference to FIG. 14 and FIG. 15, in this embodiment, a supporting assembly 120f of a projection device 10f includes a plurality of supporting members 124f, 125f, and 126f. As shown in FIG. 15, the supporting members 124f, 125f, and 126f are sequentially arranged and are pivotally connected to one another end to end, and the supporting member 124f is pivotally connected to the main casing 110.

As shown in FIG. 14, an inner contour of one of any adjacent two of the plurality of supporting members 124f, 125f, and 126f is complementary to an outer contour of the other one. Specifically, an outer contour of the supporting member 124f is complementary to an inner contour of a hole O1 of the supporting member 125f, and an outer contour of the supporting member 125f is complementary to an inner contour of a hole O2 of the supporting member 126f. Therefore, when being received, the supporting member 124f is located inside the hole O1 of the supporting member 125f, and both the supporting member 124f and the supporting member 125f are located inside the hole O2 of the supporting member 126f. The supporting members 124f, 125f, and 126f are received on the same plane, are located below the main casing 110, and are adapted to contact the surface S together.

As shown in FIG. 15, when the supporting members 124f, 125f, and 126f are in the unfolded position P2, the supporting members 124f, 125f, and 126f are flipped with respect to one another, the supporting member 126f is adapted to contact the surface S, and the projection lens 20 faces the surface S.

Figure 16:
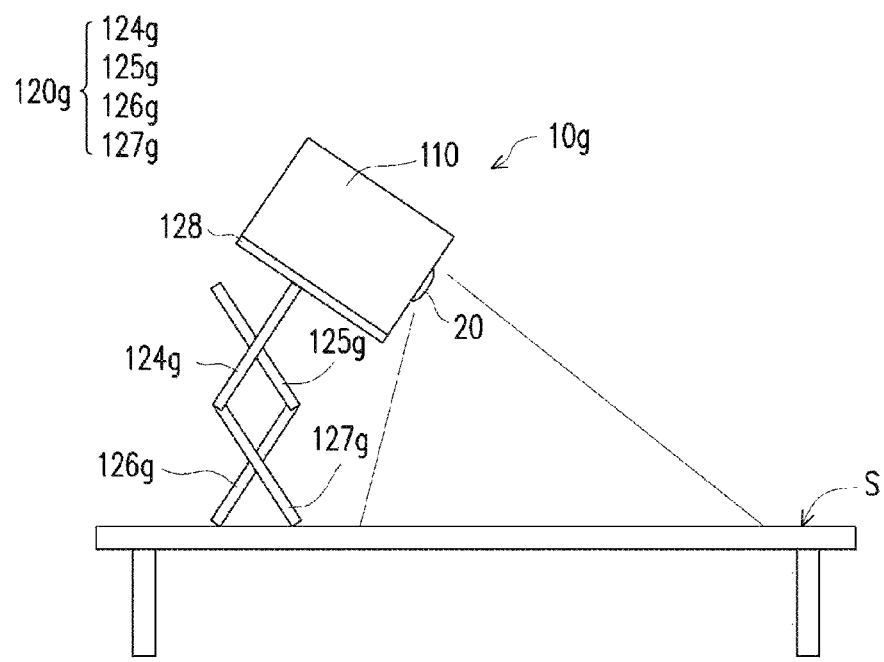
FIG. 16 is a schematic view of a projection device in the unfolded position according to another embodiment of the invention.

FIG. 16 is a schematic view of a projection device in the unfolded position according to another embodiment of the invention. With reference to FIG. 16, in this embodiment, a supporting assembly 120g of the projection device 10g includes a fixing member 128 and a plurality of supporting members 124g, 125g, 126g, and 127g. The fixing member 128 is fixed to the main casing 110, and the supporting member 124g is pivotally connected to the fixing member 128. In the present embodiment, every two supporting members among the supporting members 124g, 125g, 126g, and 127g form one layer, that is, the two supporting members 124g and 125g cross and are pivotally connected to each other, and the two supporting members 126g and 127g cross and are pivotally connected to each other. In addition, the supporting member 125g is pivotally connected to the supporting member 126g and the supporting member 124g is pivotally connected to the supporting member 127g, so that the supporting members function in a form similar to that of a retractable gate. In this way, the main casing 110 may be located away from the surface S, and that the length of the projection path is increased. Certainly, a number of the supporting members and a number of the layers are not limited therein.

In view of the foregoing, the projection device housing of the projection device provided by the invention includes the main casing and the supporting assembly disposed on the main casing in a flipping manner. When the projection device housing is located in a folded position, the supporting assembly leans against the main casing and the projection lens faces the first direction. When the projection device housing is located in the unfolded position, the supporting assembly is flipped with respect to the main casing and is adapted to stand on the surface. At this moment, the projection lens faces the second direction and is adapted to project onto the standing surface (e.g., a desktop). Accordingly, the projection device provided by the invention may project in different directions according to actual requirements and may project onto the standing surface without a tall casing or a bracket to be included or additionally assembled.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, adapted to be placed on a surface, wherein the projection device comprises a projection lens and a projection device housing, wherein
    the projection lens is connected to the projection device housing, and the projection lens is adapted to project a projection image toward a first direction; and
    the projection device housing comprises a main casing and a supporting assembly disposed on the main casing in a flipping manner, wherein
    the supporting assembly leans against the main casing when the projection device housing is located in a folded position, and
    the supporting assembly is flipped with respect to the main casing when the projection device housing is located in an unfolded position,
    wherein the supporting assembly comprises a plurality of supporting members, the plurality of supporting members are sequentially arranged and are pivotally connected to one another end to end, and one of the plurality of supporting members is connected to the main casing,
    the plurality of supporting members surround at least part of the main casing and one of the plurality of supporting members is adapted to contact the surface when the projection device housing is located in the folded position, and
    when the projection device housing is located in the unfolded position, the plurality of supporting members are flipped with respect to one another, and another one of the plurality of supporting members is adapted to contact the surface.

2. The projection device according to claim 1, wherein the main casing comprises a first groove, and at least one of the plurality of supporting members is located in the first groove when the projection device housing is located in the folded position.

3. The projection device according to claim 1, wherein the projection device housing further comprises a reflection mirror disposed on the main casing in a flipping manner, and the reflection mirror reflects the projection image toward a second direction when the projection device housing is located in the unfolded position.

4. The projection device according to claim 3, wherein the main casing comprises a second groove, and the reflection mirror is located in the second groove when the projection device housing is located in the folded position.

5. A projection device, adapted to be placed on a surface, wherein the projection device comprises a projection lens and a projection device housing, wherein the projection lens is connected to the projection device housing, and the projection lens is adapted to project a projection image toward a first direction; and the projection device housing comprises a main casing and a supporting assembly disposed on the main casing in a flipping manner, wherein the supporting assembly leans against the main casing when the projection device housing is located in a folded position, and the supporting assembly is flipped with respect to the main casing when the projection device housing is located in an unfolded position, and wherein the supporting assembly comprises a plurality of supporting members, the plurality of supporting members are sequentially arranged and are pivotally connected to one another end to end, and one of the plurality of supporting members is pivotally connected to the main casing, an inner contour of one of any adjacent two of the plurality of supporting members is complementary to an outer contour of the other one, the plurality of supporting members are received on a same plane and located below the main casing and are adapted to contact the surface together when the projection device housing is located in the folded position, and when the projection device housing is located in the unfolded position, the plurality of supporting members are flipped with respect to one another, and the one of the plurality of supporting members is adapted to contact the surface.

\* \* \* \* \*